Figure 1:
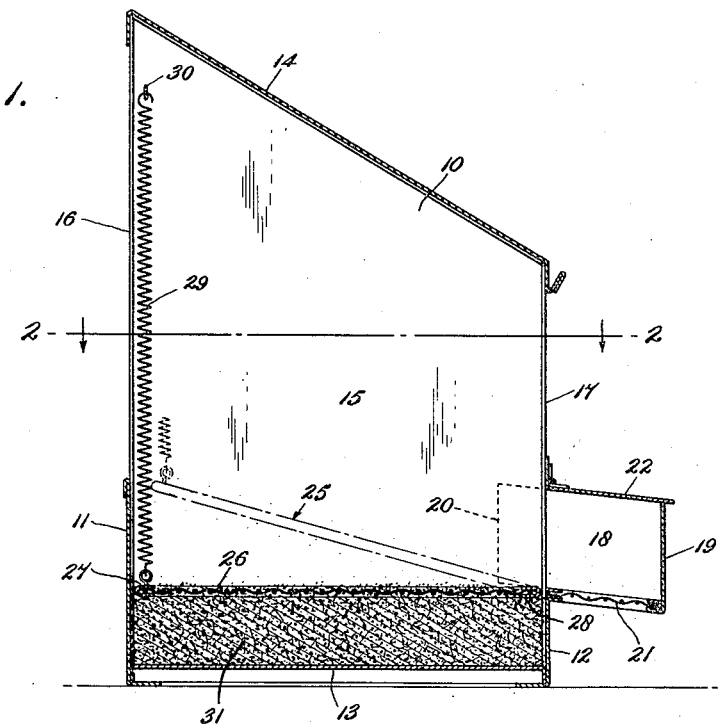

Oct. 9, 1956

C. H. INMAN 2,765,772

POULTRY TRAP NEST

Filed Sept. 28, 1951

INVENTOR
Clark H. Inman,

BY

ATTORNEY

United States Patent Office 2,765,772
Patented Oct. 9, 1956

2,765,772

POULTRY TRAP NEST

Clark H. Inman, Lakewood, N. J.

Application September 28, 1951, Serial No. 248,805

3 Claims. (Cl. 119—48)

The invention relates to poultry nests and has for its principal object to provide an improved metallic nest of the so-called "automatic" type embodying features which render it more attractive to the fowls.

In the parlance of poultry and egg farmers, an "automatic" nest is one in which, as the fowl leaves the nest compartment at the conclusion of her egg laying function, the egg is automatically transferred from such compartment to a smaller auxiliary compartment adjacent to and in communication with the main compartment. The auxiliary compartments are of a size sufficient to accommodate several eggs, whereby it is necessary to remove them only at intervals while at the same time the main compartment, when unoccupied, is always free of eggs.

One form of automatic nest heretofore proposed includes a floor or grid pivotally mounted in the main compartment for vertical swinging movements, with one of its edges disposed adjacent the opening through which the eggs are discharged to the auxiliary compartment. Springs, weights or the like connected to the grid bias it to an inclined normal position in which it slopes downwardly toward said opening, but when a fowl enters the nest and places her weight upon the grid the biasing means yield and the grid descends to a substantially horizontal position, preferred by the fowls during the laying function. When the hen leaves the nest after the egg is laid, the biasing means restore the grid to its inclined position, with the result that the egg rolls down the grid and into the auxiliary compartment.

I have noted however, that when the grids are constructed of metallic rods, bars or wire mesh, the fowls have a marked dislike for such nests and usually will select some other nest, if available, in preference to them. On the other hand, I have also found that such aversion on the part of the fowls may be overcome to a large extent if not completely eliminated, if there be provided below the grid a bed of particulate material in which the grid may at least partially submerge itself when it descends under a fowl's weight. While it is not absolutely essential that said particulate material be of vegetable orgin, materials such as saw-dust, chopped excelsior, chopped hay or straw, and more especially oat hulls or "litter", seem to give the best results. The particles of the material should be small enough to readily pass through the apertures of the grid whereby the rods or wires of the latter may be at least partially embedded and/or covered when the grid is forced down by the fowl, and thus elongated filamentary materials such as hay, straw and excelsior in their ordinary state are not satisfactory.

Figure 2:
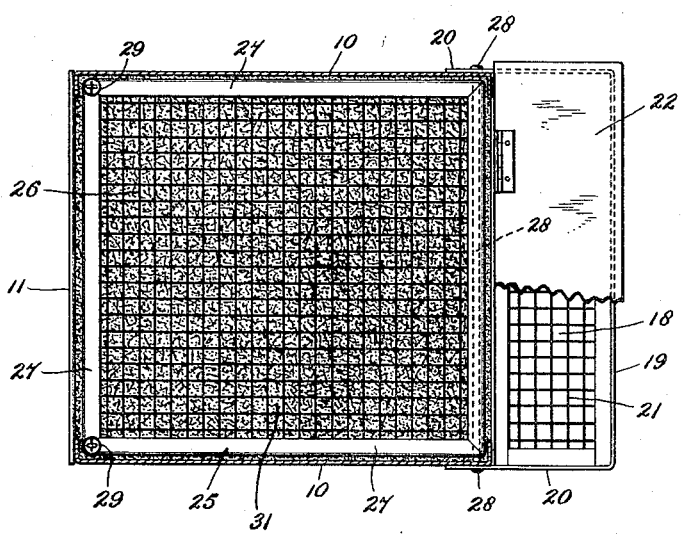

For purposes of completing the disclosure the invention is illustrated in the accompanying drawing forming a part of this specification, in which:

Figure 1 is a central vertical sectional view of a metal nest structure embodying a resiliently biased hinged grid of reticulate material and provided with a bed of particulate material underlying such grid, in accordance with the invention; and Fig. 2 is a horizontal sectional view, partly broken away, on the plane indicated by the line 2—2 in Fig. 1, looking downward.

The nest structure shown is formed of metal sheets and comprises the spaced side panels 10 extending the full height of the nest and connected by the shorter front and rear panels 11 and 12. These four panels enclose a floor panel 13 and the side panels support a sloping roof 14. The several panel elements are bolted, riveted or welded together substantially as shown to provide the laying enclosure or compartment 15 to which the fowls have free access through the opening 16 provided between the roof and the top of the short front panel 11. The rear of the structure is also open between the roof and the rear panel 12, as indicated at 17, and the lower portion of such opening affords communication between the main compartment 15 and an auxiliary compartment 18 formed by a wall member 19 having angularly disposed end portions 20 which are rigidly attached to the side panels 10. The said auxiliary compartment 18 also has a bottom 21 of reticulate material, and a hinged cover 22 affording ready access to the compartment for the removal of the eggs.

Within the main compartment 15 there is provided a rectangular grid 25 comprising a piece of wire mesh or similar reticulate material 26, the openings of which preferably are on the order of about one-quarter to three-eights of an inch square. The edges of this element are enclosed by a metal frame 27 and the rearward edge of the grid is pivotally connected to the side panels 10 by a rod or hinge pin 28, the mounting being such as to dispose the said rearward edge of the grid adjacent and at approximately the same height as the forward edge of the bottom element 21 of the auxiliary compartment 18, as will be clear from Fig. 1, whereby the eggs may roll from the grid into the auxiliary compartment without appreciable jolting. To each forward corner of the grid 25 there is attached the lower end of a coiled tension spring 29, the upper ends of which springs being anchored to the side panels 10 by eyes 30. These springs normally bias the grid to an inclined position as indicated in broken lines in Fig. 1, with its forward edge adjacent the upper edge of the front panel 11; however, when a hen enters the nest through the opening 16 and puts her weight upon the grid, the latter descends to the full line position illustrated in said figure.

A layer or bed of particulate material 31 is disposed on the floor 13, such bed being of a depth sufficient that when the grid 25 descends under the fowl's weight the grid will engage the upper surface of the particulate material and at least partially embed or submerge the wires or bars of the grid in such material. As previously indicated, the particulate material preferably comprises oat hulls or "litter", sawdust, chopped hay or straw, chopped excelsior or the like, as I have found that each of these markedly overcomes the aversion the fowls have for the metal grid type of nest. This perhaps is due to the fact that upon restoration of the grid to its normal inclined position when a fowl leaves the nest, some of the particulate material clings to the grid wires or bars.

What is claimed is:

1. In a poultry nest the combination of a structure providing a main laying compartment and an auxiliary egg-receiving compartment in communication therewith; a grid pivotally mounted in said main compartment for vertical swinging movements between a substantially horizontal egg-receiving position and an inclined position in which the eggs may roll into said auxiliary compartment, said grid having openings of substantially uniform size therethrough; yieldable means connected to and biasing the grid to said inclined position, said means permitting the grid to descend to said horizontal position under the weight of a fowl; and a layer of particulate material disposed in said main compartment below the grid, said material being composed of particles the maximum dimensions of each of which are less than the minimum horizontal dimensions of one of said grid openings, whereby the particles may pass through such openings and at least partially temporarily embed the grid members in said material when the grid is lowered to said horizontal position.

2. In a poultry nest the combination of a structure providing a main laying compartment and an auxiliary egg-receiving compartment communicating therewith; a metallic grid pivotally mounted in said main compartment for vertical swinging movements between a substantially horizontal egg-receiving position and an inclined position in which the eggs may roll into said auxiliary compartment, said grid having openings of substantially uniform size therethrough; resilient means connected to and biasing the grid to said inclined position, said means permitting the grid to descend to said substantially horizontal position under the weight of a fowl; and a layer of particulate material of vegetable origin disposed in said main compartment below the grid, said material being composed of particles the maximum dimensions of each of which are less than the minimum horizontal dimensions of one of said grid openings, whereby the particles may readily pass through such openings and at least partially temporarily embed the grid members in said material when the grid is lowered to said horizontal position.

3. In a nest for laying poultry, the combination of a structure providing a main laying compartment and an auxiliary egg-receiving compartment communicating therewith; a reticulate metallic grid having openings of substantially uniform size therethrough, said grid being pivotally mounted in said main compartment for vertical swinging movements between a substantially horizontal egg-receiving position and an inclined position in which the eggs may roll into said auxiliary compartment; yieldable means connected to and biasing the grid to said inclined position, said means permitting the grid to descend to said substantially horizontal position under the weight of a fowl; and a layer of oat "litter" disposed in said main compartment below the grid, the individual particles of such material having maximum dimensions which are less than the minimum horizontal dimensions of one of said grid openings, whereby said particles may readily pass through such openings and at least partially temporarily embed the members of the grid in said material when the grid is lowered to said horizontal position.

References Cited in the file of this patent

UNITED STATES PATENTS

| | | |
|---|---|---|
| 1,329,963 | Faust | Feb. 3, 1920 |
| 2,014,900 | Lapp | Sept. 17, 1935 |
| 2,035,286 | Wenzel | Mar. 24, 1936 |
| 2,179,591 | Godchaux | Nov. 14, 1939 |
| 2,279,147 | Stimson | Apr. 7, 1942 |
| 2,376,672 | Dreyling | May 22, 1945 |
| 2,470,346 | Frankenhoff | May 17, 1949 |
| 2,477,892 | Paquette | Aug. 2, 1949 |
| 2,592,430 | King | Apr. 8, 1952 |